United States Patent
Fuse et al.

(10) Patent No.: US 10,664,964 B2
(45) Date of Patent: May 26, 2020

(54) ABNORMAL DETECTION APPARATUS AND METHOD

(71) Applicant: FUJITSU LIMITED, Kawasaki-shi, Kanagawa (JP)

(72) Inventors: Takashi Fuse, Hadano (JP); Tetsuo Koezuka, Hachioji (JP)

(73) Assignee: FUJITSU LIMITED, Kawasaki (JP)

( * ) Notice: Subject to any disclaimer, the term of this patent is extended or adjusted under 35 U.S.C. 154(b) by 168 days.

(21) Appl. No.: 15/909,600

(22) Filed: Mar. 1, 2018

(65) Prior Publication Data

US 2018/0189943 A1 Jul. 5, 2018

Related U.S. Application Data

(63) Continuation of application No. PCT/JP2015/074978, filed on Sep. 2, 2015.

(51) Int. Cl.
*G06T 7/00* (2017.01)
*H04N 5/232* (2006.01)
(Continued)

(52) U.S. Cl.
CPC ........ *G06T 7/0002* (2013.01); *G06K 9/00771* (2013.01); *G06T 5/003* (2013.01);
(Continued)

(58) Field of Classification Search
CPC ....... G06T 7/0002; G06T 5/003; G06T 7/001; G06K 9/00771; H04N 5/232; H04N 5/23229
See application file for complete search history.

(56) References Cited

U.S. PATENT DOCUMENTS 5,402,521 A * 3/1995 Niida ................. G06K 9/00536
706/20
2004/0190766 A1 9/2004 Watanabe et al.
(Continued)

FOREIGN PATENT DOCUMENTS

JP 7-21367 1/1995
JP 2004-295223 10/2004
(Continued)

OTHER PUBLICATIONS

Ishida, Hiroyuki, et al. "Recognition of camera-captured low-quality characters using motion blur information." Pattern Recognition 41.7 (2008): 2253-2262. (Year: 2008).*

(Continued)

*Primary Examiner* — David F Dunphy
(74) *Attorney, Agent, or Firm* — Staas & Halsey LLP

(57) ABSTRACT

An abnormal detection apparatus including an imaging unit configured to image generate a first and second image frames included in a first image frame group; a pseudo work generation unit configured to generate the first and a third image frames, the third and the second image frames, or the third and a fourth image frames, included in a second image frame group, respectively, with respect to the first and second image frames included in the first image frame group; a normal space generation unit configured to generate a normal space data based on the first and second image frames included in the first image frame group, and the first and third image frames, the third and second image frames, or the third and fourth image frames, included in the second image frame group; and a comparison unit configured to detect abnormality based on the normal space data.

8 Claims, 14 Drawing Sheets

(51) Int. Cl.
　　*G06T 5/00* (2006.01)
　　*G06K 9/00* (2006.01)
　　*H04N 5/14* (2006.01)

(52) U.S. Cl.
　　CPC .......... *G06T 7/001* (2013.01); *H04N 5/232* (2013.01); *H04N 5/23229* (2013.01); *G06T 2207/20201* (2013.01); *G06T 2207/30108* (2013.01); *H04N 5/144* (2013.01); *H04N 5/23264* (2013.01)

(56) References Cited

U.S. PATENT DOCUMENTS

| | | | | |
|---|---|---|---|---|
| 2007/0291991 | A1* | 12/2007 | Otsu | G06K 9/00335 382/104 |
| 2008/0123975 | A1* | 5/2008 | Otsu | G06K 9/00342 382/236 |
| 2009/0179766 | A1* | 7/2009 | Kashio | B25J 9/1674 340/686.1 |
| 2012/0113279 | A1* | 5/2012 | Park | H04N 5/232 348/208.6 |
| 2016/0139977 | A1* | 5/2016 | Ashani | G06F 11/0706 714/26 |
| 2017/0024874 | A1* | 1/2017 | Pang | G06K 9/00389 |
| 2017/0249728 | A1* | 8/2017 | Fuse | G06T 7/248 |
| 2018/0197311 | A1* | 7/2018 | Takizawa | B25J 9/1602 |
| 2019/0088178 | A1* | 3/2019 | Ward | G06T 5/003 |
| 2019/0180111 | A1* | 6/2019 | Kim | H04N 21/234318 |

FOREIGN PATENT DOCUMENTS

| | | |
|---|---|---|
| JP | 2006-79272 | 3/2006 |
| JP | 2008-254074 | 10/2008 |

OTHER PUBLICATIONS

Rozantsev, Artem, Vincent Lepetit, and Pascal Fua. "On rendering synthetic images for training an object detector." Computer Vision and Image Understanding 137 (2015): 24-37. (Year: 2015).*

Itoh et al., "Robust Acoustic Modeling Using MLLR Transformation-based Speech Feature Generation," IEICE Technical Report, vol. 110, No. 357, Dec. 2010, 8 pp.

International Search Report dated Dec. 8, 2015 in corresponding International Patent Application No. PCT/JP2015/074978.

Written Opinion of the International Searching Authority dated Dec. 8, 2015 in corresponding International Patent Application No. PCT/JP2015/074978.

Kinoshita, "Introduction to multivariate analysis by a plain mathematical model," Kindai Kagaku sya Co., Ltd, Apr. 1995, pp. 126-127.

Arai, "Linear Algebra basic and application," Nippon Hyoron sha Co., Ltd, Feb. 2006, pp. 326-327.

Japanese Office Action for corresponding JP Patent Application No. 2017-537143 dated Jan. 7, 2020.

* cited by examiner

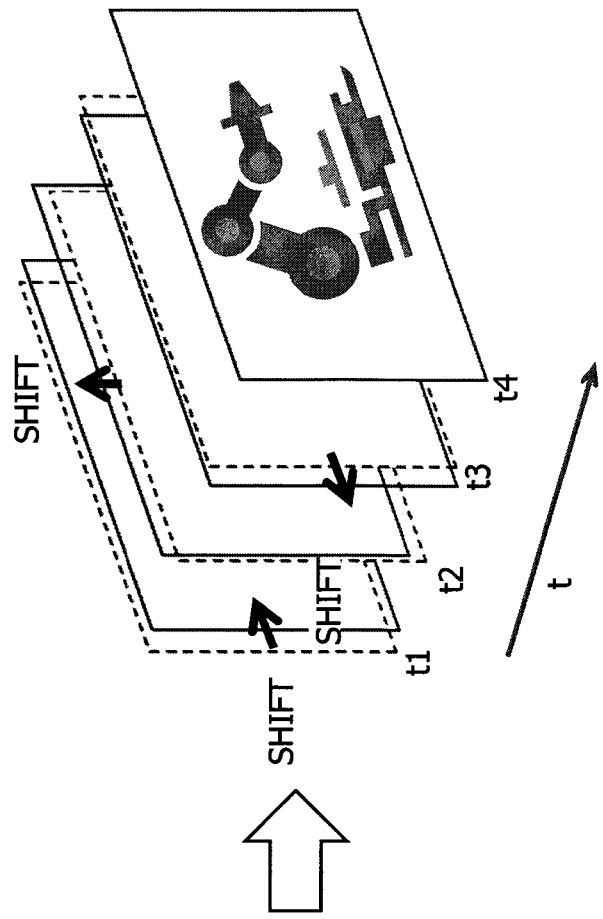
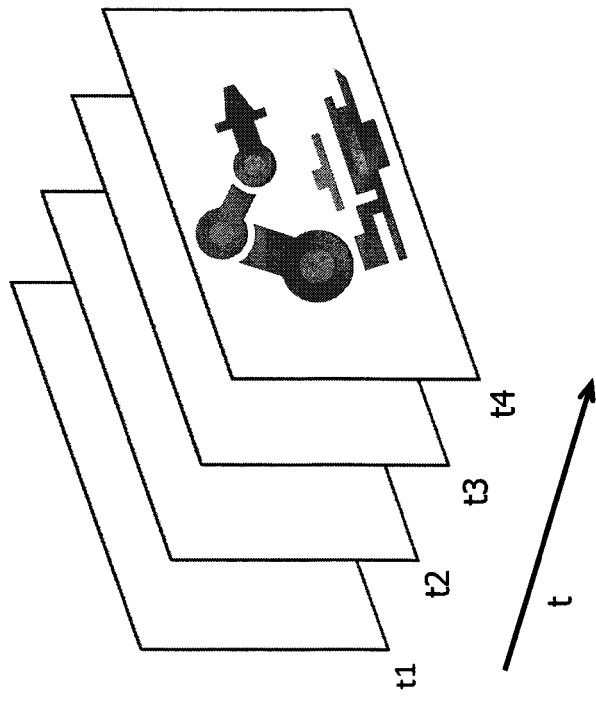

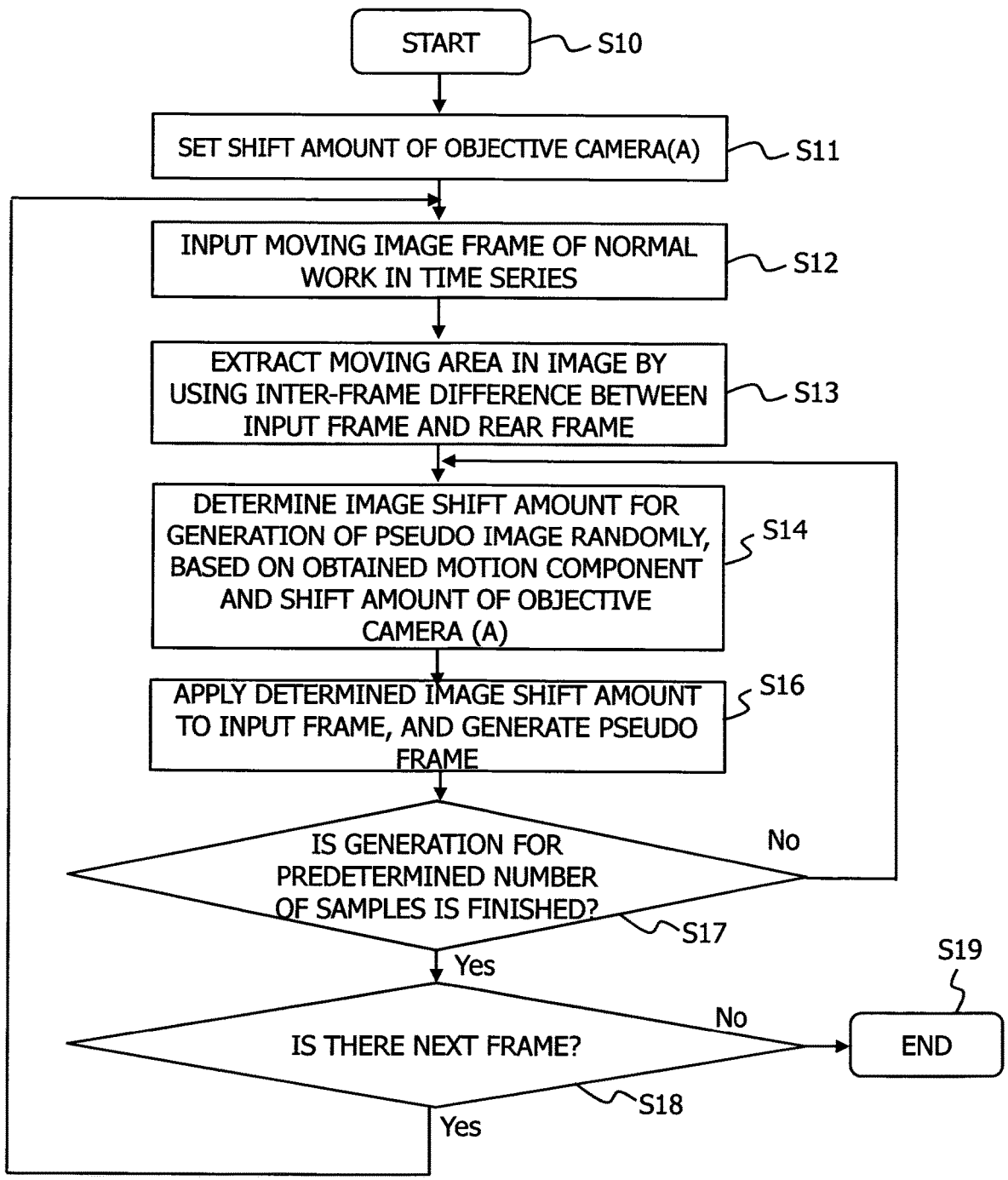

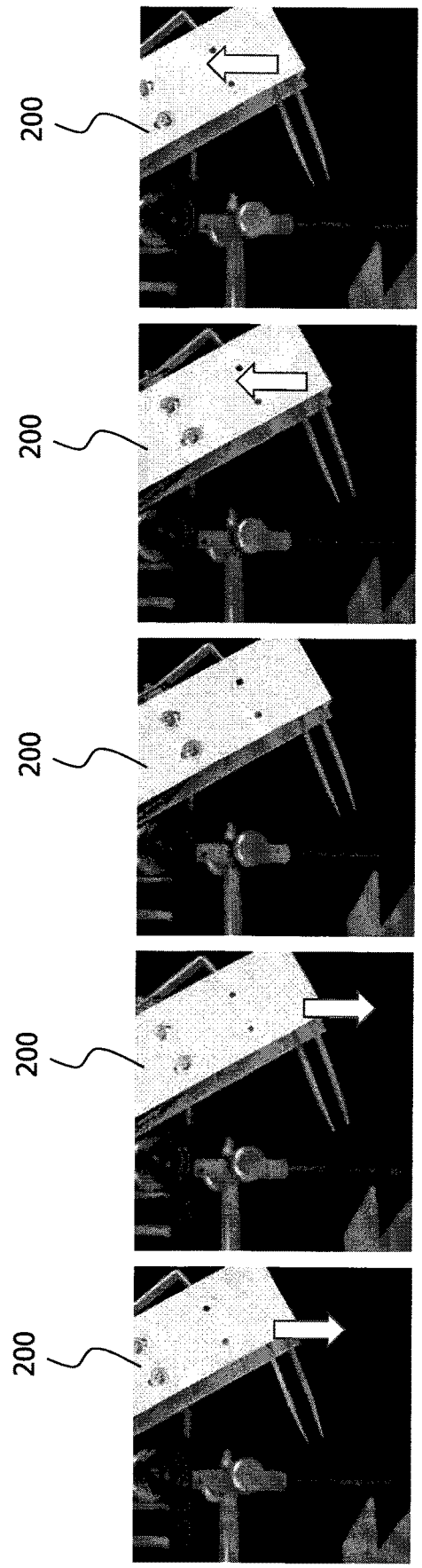

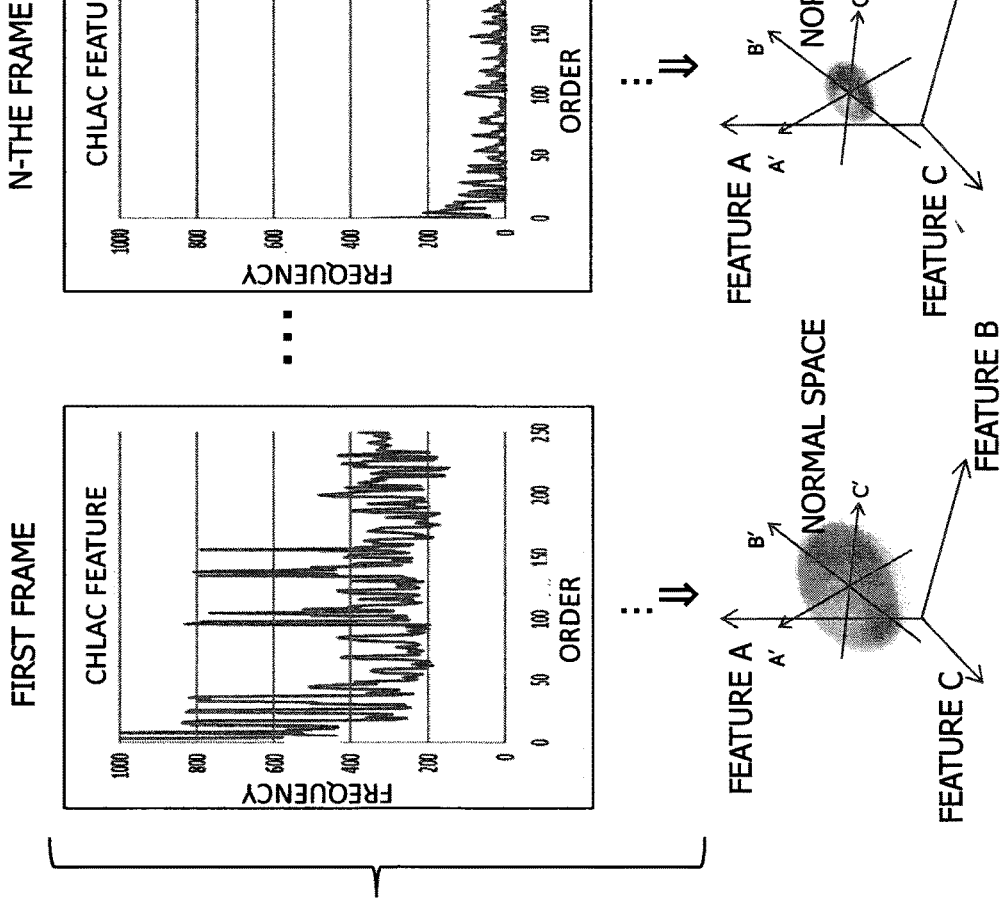

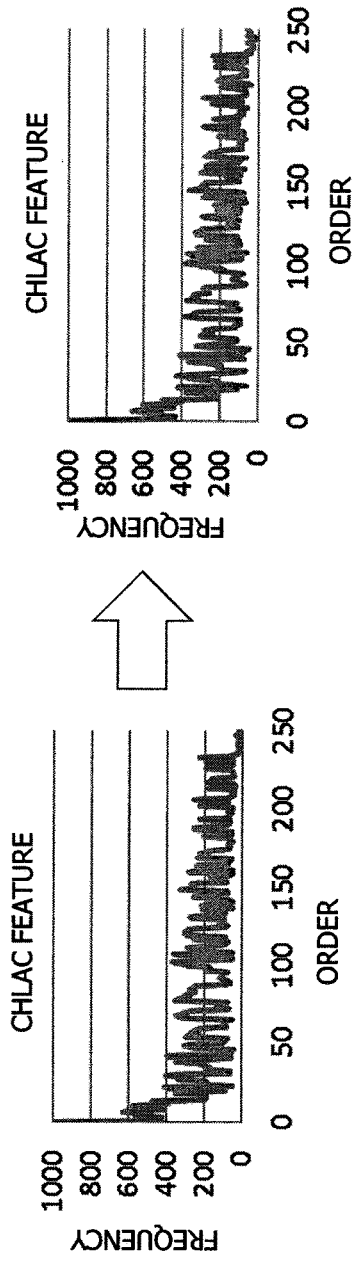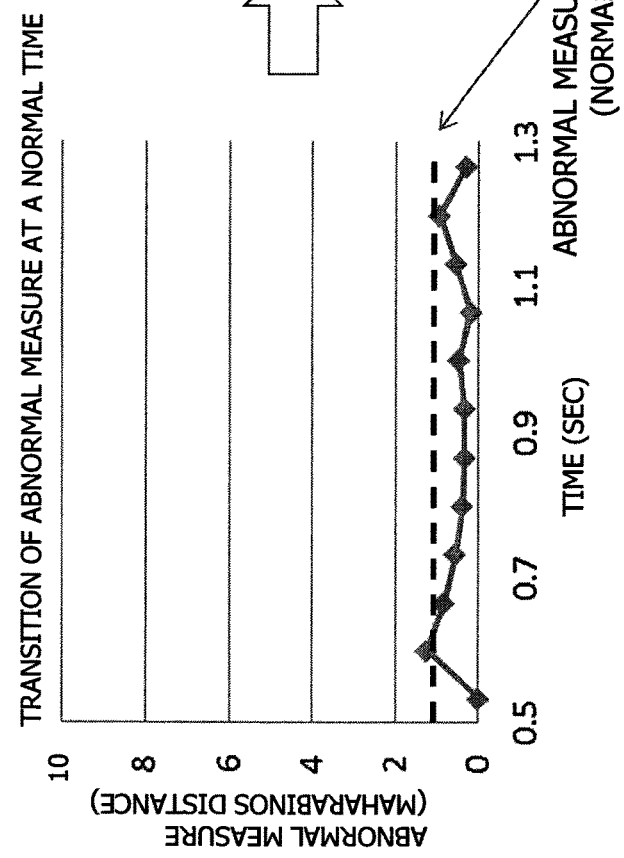

REAL WORK DATA
(SUPPOSING CALCULATION OF MOVING IMAGE FEATURE BY USING FRAMES (t5, t7 and t9) WITH CIRCLE OUT OF THE ABOVE FRAMES)

PSEUDO WORK DATA
(CALCULATION OF MOVING IMAGE FEATURE BY USING FRAMES (t4, t6 and t9) WITH CIRCLE OUT OF THE ABOVE FRAMES)

ABNORMAL DETECTION APPARATUS AND METHOD

CROSS-REFERENCE TO RELATED APPLICATION

This application is a continuation application of International Application Number PCT/JP2015/074978 filed on Sep. 2, 2015 and designated the U.S., the entire contents of which are incorporated herein by reference.

FIELD

The embodiments discussed herein are related to an abnormal detection apparatus and method.

BACKGROUND

Conventionally, there is an abnormal detection apparatus detecting an abnormality of a robot used for Factory Automation work such as assembly work or the like. By the abnormal detection apparatus, the abnormality of the robot is detected, and by specification of the cause, measure, improvement or the like, it is possible to perform efficient Factory Automation work, for example.

In the abnormal detection apparatus, there is a case of detecting the abnormality by imaging the work of an objective robot by using a camera or the like and performing image processing to the imaged image data. For example, there is a following abnormal detection apparatus. Namely, the abnormality apparatus extracts feature data (or moving image feature, which may hereafter be referred to as "moving image feature") from a plurality of image frames by allowing the robot to carry out normal work, and generates a normal space data including a plurality of feature data. And, the abnormal detection apparatus compares the normal space data with the moving image feature extracting by operation work of the robot and calculates abnormal measure. The abnormal detection apparatus notifies the abnormality by an alarm or like when the calculated abnormal measure exceeds a set value.

There is a case that a number of dimensions of the moving image feature (for example, a number of a type of the moving image feature) is a few hundred, and the abnormal detection apparatus can acquire the moving image feature efficiently by reducing the number of dimensions by a technique of Principal Component Analysis (PCA) or like. To reduce the number of dimensions may hereinafter be referred to as "contraction", for example. For example, by causing the robot to carry out real work being equal or higher than the number of dimensions of the moving image feature, the abnormal detection apparatus can perform contraction of the number of dimensions of the moving image feature efficiently. Therefore, when the number of dimensions of the moving image feature is a few hundred, there is a case that the abnormal detection apparatus acquires image data by causing the robot to perform the work repeatedly at hundreds of time.

Such techniques related to image processing include techniques as follows, for example. Namely, there is an image processing apparatus that performs N times of geometric transformations to model pattern, generates a transformation model pattern indicating appearance of an object of relative posture in three-dimensionally different with respect to standard relative posture, and performs pattern matching by using the transformation model pattern to the image data. According to the above techniques, it is urged that the object whose position and posture are not fixed can be detected and its three-dimensionally position and/or two-dimensionally posture can be recognized.

Further, there is a motion editing apparatus for a robot, which changes a position and inclination of each body part of a model of the robot in three-dimensional pseudo space, calculates an angle of each joint of the robot, generates key frame data, and outputs the generated key frame data to an articulated robot. It is urged that, according to the above technique, the motion editing apparatus for the robot to generate various kinds of motion data of the robot easily can be provided.

CITATION LIST

Patent Literature

Patent Literature 1: Japanese Laid-Open Patent Publication No. 2004-295223.
Patent Literature 2: Japanese Laid-Open Patent Publication No. 2008-254074.

Non-Patent Literature

Non-Patent Literature 1: "Introduction to multivariate analysis by a plain mathematical model", Eizo Kinoshita, Kindai Kagaku sya Co., Ltd, April 1995.
Non-Patent Literature 2: "Linear Algebra basic and application", Hitoshi Arai, Nippon Hyoron sha Co., Ltd, February 2006.

As mentioned above, when the number of dimensions of the moving image feature is a few hundred, there is the case that the abnormal detection apparatus acquires the image data by causing the robot to perform the work repeatedly at hundreds of time. However, it becomes difficult from the point of view of time to cause the robot to perform the work repeatedly at hundreds of time when the Factory Automation work is started.

The above-mentioned image processing apparatus, for example, generates the transformation model pattern indicating appearance of the object of relative posture in three-dimensionally different with respect to standard relative posture, performs the pattern matching, and is not disclosed about the solution to time difficulty when the Factory Automation work is started. And, the above-mentioned motion editing apparatus, for example, outputs the generated key frame data to the articulated robot, and is not disclosed about the solution to time difficulty when the Factory Automation work is started.

SUMMARY

According to an aspect of the embodiment, an abnormal detection apparatus including: an imaging unit configured to image an object and generate a first and second image frames included in a first image frame group; a pseudo work generation unit configured to generate the first image frame and a third image frame, the third image frame and the second image frame, or the third image frame and a fourth image frame, included in a second image frame group, respectively, with respect to the first and second image frames included in the first image frame group; a normal space generation unit configured to generate a normal space data based on the first and second image frames included in the first image frame group, and the first and third image frames, the third and second image frames, or the third and fourth image frames, included in the second image frame group; and a comparison unit configured to detect abnormality of the object based on the normal space data.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3A is a diagram illustrating an example of a real image frame, and FIG. 3B is a diagram illustrating an example of a pseudo image frame, respectively.

FIG. 4 is a flowchart illustrating an example of operation.

FIG. 5A to FIG. 5E are diagrams illustrating examples of real work.

FIG. 6A to FIG. 6C are diagrams illustrating examples of CHLAC feature and normal space.

FIG. 10A to FIG. 10D are diagrams illustrating detection examples of abnormal measure by real work.

DESCRIPTION OF EMBODIMENTS

Figure 1:
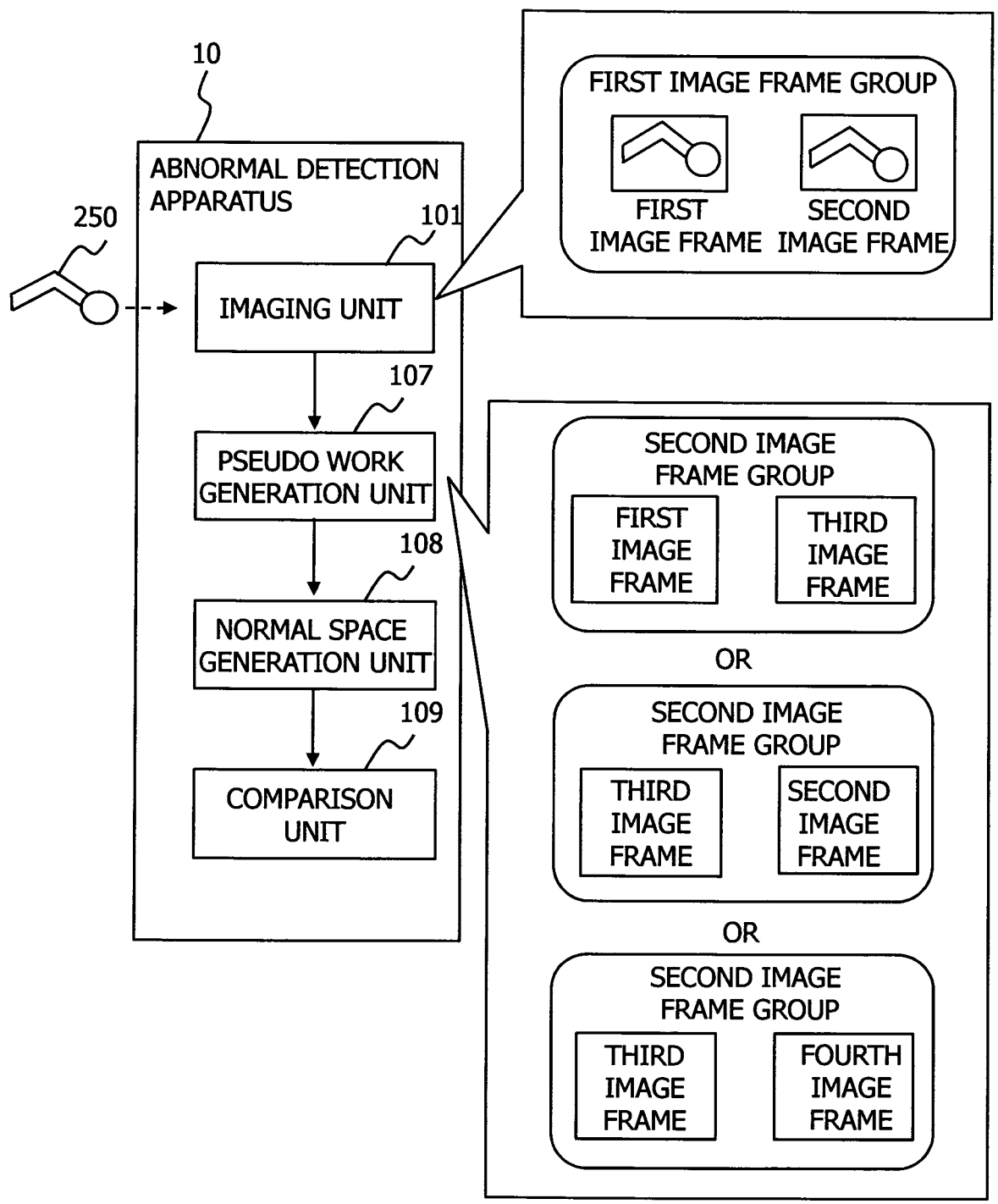
FIG. 1 is a diagram illustrating a configuration example of an abnormal detection apparatus.

Hereinafter, the present embodiments will be described in detail by referring to the drawings. The problem and the embodiments in the present description are merely examples, and are not intended to restrict the scope of right of the present application. In particular, even if the expression of the description is different, the technique according to the present application is applicable as long as being technically equivalent in spite of the different expression, and the scope of right is not restricted.

First Embodiment

FIG. 1 is a diagram illustrating a configuration example of an abnormal detection apparatus 10 according to the first embodiment. The abnormal detection apparatus 10 images same work of an object 250 at one or more time, generates a plurality of image frames, and generates a normal space data based on the generated plurality of image frames. And, the abnormal detection apparatus 10 extracts feature data from the plurality of image frames obtained by imaging real work of the object 250, compares the extracted feature data with the normal space data, and detects abnormality of the object 250.

The abnormal detection apparatus 10 includes an imaging unit 101, a pseudo work generation unit 107, a normal space generation unit 108, and a comparison unit 109.

The imaging unit 101 images the object 250, and generates a first and second image frames included in a first image frame group.

The pseudo work generation unit 107 generates the first image frame and a third image frame, the third and second image frames, or the third image frame and a fourth image frame, included in a second image frame group, with respect to the first and second image frames included in the first image frame group. For example, the first and second image frames included in the first image frame group is an image frame obtained by normal work or the real work of the object 250, and each image frames included in the second image frame group is an image frame obtained by pseudo work.

The normal space generation unit 108 generates the normal space data based on the first and second image frames included in the first image frame group and the first and third image frames, the third and second image frames, or the third and fourth image frames, included in the second image frame group. In this case, the normal space generation unit 108 calculates the feature data based on the each image frame included in the first image frame group and the each image frame included in the second image frame group, and generates the normal space data including a plurality of the feature data. For example, the normal space generation unit 108 may calculate the feature data by using Cubic Higher-order Local Auto Correlation (CHLAC) to the each image frame included in the first and second image frame groups.

The comparison unit 109 detects the abnormality of the object based on the normal space data. For example, the comparison unit 109 may extract the feature data from the plurality of image frame obtained by imaging real work of the object 250, and detect the abnormality of the object 250 by comparing the extracted feature data with the normal space data.

For example, there is a case that the abnormal detection apparatus generates N-number of the first image frame group by causing the object 200 to repeat the work at N (N is an integer of 1 or more) times, and generates the normal space data based on the image frame included in the N-number of first image frame group.

On the other hand, the abnormal detection apparatus 10 according to the first embodiment generates the each image frame included in the second image frame group from the each image frame of the first image frame group, and generates the normal space data based on the each image frame included in the first and second image frame group. Namely, the abnormal detection apparatus 10 generates each image data included in the second image frame group by the pseudo work generation unit 107, and generates the normal space data by using this.

Therefore, in the abnormal detection apparatus 10 according the first embodiment, it is possible to perform the real work lower than N times by generating the image frame by the pseudo work, in comparison with a case that the real work is repeated N in order to obtain the image frame included in the first image frame group. Thus, the abnormal detection apparatus 10 can reduce the number of repetition time of the real work to the object 250.

Further, in the abnormal detection apparatus 10 according the first embodiment, the each image data included in the second image frame group is an image frame in which at least one of the first and second image frame included in the first image frame group is different. Hence, an inter-frame difference of the each image data included in the first image frame group and an inter-frame difference of the each image data included in the second image frame group are different. Thereby, the abnormal detection apparatus 10 according to the first embodiment can calculate more feature data than a predetermined number, and generate accurate the normal space data.

Accordingly, the abnormal detection apparatus 10 according the first embodiment can generate the accurate normal space data with a small number of work.

Second Embodiment

Next, a second embodiment will be described.
<Configuration Example of an Abnormal Detection Apparatus>

Figure 2:
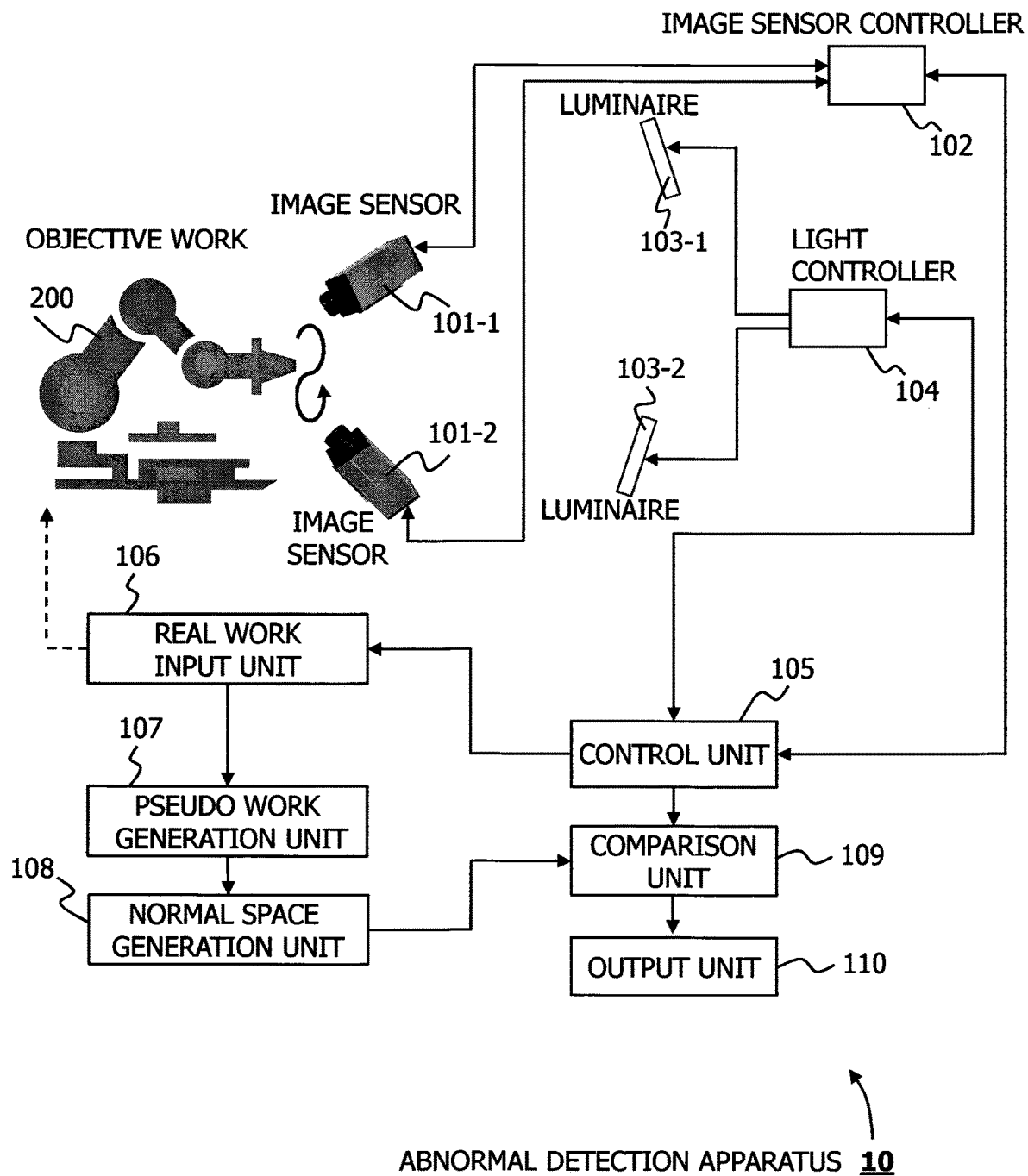
FIG. 2 is a diagram illustrating a configuration example of an abnormal detection apparatus.

FIG. 2 is a diagram illustrating a configuration example of an abnormal detection apparatus 10 according to the second embodiment. The abnormal detection apparatus 10 illustrating in FIG. 2 indicates an example of the abnormal detection apparatus 10 with respect to a robot 200 performing Factory Automation work such as assembling work or the like. Further, the object 250 according to the first embodiment corresponds to the robot 200 according to the second embodiment, for example.

The abnormal detection apparatus 10 performs a following process, for example. Namely, the abnormal detection apparatus 10 images the work by causing the robot 200 to repeat same work at a plurality of times, calculates the feature data (or moving image feature, which may hereafter be referred to as "moving image feature") based on the imaged image data, calculates the moving image feature, and generates the normal space data. For example, data including one or more moving image feature may hereafter be referred to as the normal space data.

The abnormal detection apparatus 10 images operation work of the robot 200 under operation of the robot 200 or the like, too, and calculates the moving image feature based on the imaged image data. The abnormal detection apparatus 10 compares the moving image feature calculated under operation with the normal space data successively, and calculates abnormal measure (or abnormal value or abnormal degree, which may hereafter be referred to as "abnormal measure"). And, the abnormal detection apparatus 10 detects abnormality of the robot 200 when the calculated abnormal measure exceeds a threshold value, and notifies the abnormality by sounding an alarm or the like. On the other hand, the abnormal detection apparatus 10 detects normality of the robot 200 when the calculated abnormal measure is equal to or less than the threshold value.

The abnormal detection apparatus 10 includes an image sensor 101-1, 101-2, an image sensor controller 102, a luminaire 103-1, 103-2, a light controller 104, and a control unit 105. Further, the abnormal detection apparatus 10 includes a real work input unit 106, a pseudo work generation unit 107, a normal space generation unit 108, a comparison unit 109, and an output unit 110.

Further, the image sensor 101-1, 101-2 corresponds to the imaging unit 101 according to the first embodiment, for example.

The image sensor (or imaging unit) 101-1, 101-2 is a camera for example, and images the robot 200 according to a control signal output from the image sensor controller 102. The image sensor 101-1, 101-2 generates the image data by imaging the robot 200, and outputs the generated image data to the image sensor controller 102. An image frame generated by the image sensor 101-1, 101-2 includes the image data, for example. Hereinafter, it is used without discriminating the meaning among the image data, the image frame, and an image frame data, especially. Further, the image sensor 101-1, 101-2 indicated by FIG. 2 indicates an example of two, but may be one or more than three.

The image sensor controller 102 generates the control signal instructing start or end of imaging, or the like, based on the control signal output from the control unit 105, and outputs the generated control signal to the image sensor 101-1, 101-2. Further, the image sensor controller 102 outputs the image data received from the image sensor 101-1, 101-2 to the control unit 105.

The luminaire 103-1, 103-2 is a light for example, and irradiates the light to the robot 200 with the light according to a control signal output from the light controller 104. The luminaire 103-1, 103-2 may one luminaire or more than three.

The light controller 104 generates the control signal controlling ON or OFF of the light of the luminaire 103-1, 103-2, based on the control signal output from the control unit 105, and outputs the generated control signal to the luminaire 103-1, 103-2.

Further, the light controller 104 and the luminaire 103-1, 103-2 does not necessary be included in the abnormal detection apparatus 10.

The control unit 105 controls the image sensor controller 102, the light controller 104, and the real work input unit 106. The control unit 105 generates the control signal instructing the start or end of the imaging, and outputs the generated control signal to the image sensor controller 102. Further, the control unit 105 receives the image data output from the image sensor controller 102, and performs a process to the received image data or outputs the image data to the real work input unit 106. Further, the control unit 105 generates the control signal instructing ON or OFF of a power supply of the luminaire 103-1, 103-2, and outputs the generated control signal to the light controller 104. Further, the control unit 105 generates a control signal instructing performance of real work to the robot 200, and outputs the generated control signal to the real work input unit 106.

The real work input unit 106 controls the robot 200 based on the control signal output from the control unit 105, and causes the robot 200 to perform an objective work. The real work input unit 106 can cause the robot 200 to perform the objective work at a plurality of times, for example. The real work input unit 106 outputs the image data received from the control unit 105 to the pseudo work generation unit 107.

The pseudo work generation unit 107 generates an image frame being pseudo to the image frame received from the real work input unit 106. Hereinafter, the image frame being pseudo may be referred to as a pseudo image frame, and the generation of the pseudo image frame may be referred to as pseudo work.

FIG. 3A and FIG. 3B are diagrams illustrating examples of generation method for the pseudo image frames. In the second embodiment, the pseudo work generation unit 107 generates the pseudo image frame as follows, for example.

Namely, the image sensor 101-1, 101-2 generates the plurality of image frames included in a first image frame group by imaging the objective work. The pseudo work generation unit 107 generates a third image frame shifted each pixel included in a first image frame (for example, an image frame at time t1 in FIG. 3) included in the first image frame group to a first direction. Further, the pseudo work generation unit 107 generates a fourth image frame shifted each pixel included in a second image frame (for example, an image frame at time t2 in FIG. 3) included in the first image frame group to a second direction. In this case, a shift direction is a direction within a plane on the image frame and indicates a spatial direction in each image frame. Further, the pseudo work generation unit 107 selects the first and second directions randomly. In the example of FIG. 3B, the pseudo work generation unit 107 generates the pseudo image frame shifted the image frame at time t1 to a right direction and the pseudo image frame shifted the image frame at time t2 to an upper direction.

In this way, the pseudo work generation unit 107 generates the image frame included in the second image frame group, by generating shifted image frame to spatial on the image frame with respect to the first and second image frames included in the first image frame groups.

Further, as indicated in FIG. 3A, the image frame obtained by imaging an actual work in the image sensor 101-1, 101-2 may referred to as real image frame, for example. And, an actual work performed to obtain the real image frame may referred to as the real work, for example.

FIG. 3B indicates an example that the pseudo work generation unit 107 shifts all the real image frames. For example, the pseudo work generation unit 107 may shift each one image frame (for example, t1) out of two image frames (for example, t1, t2) included in the first image fame group, and need not shift the other. Or, the pseudo work generation unit 107 may shift each one image frame (for example, t1) out of three image frames (for example, t1 to t3) included in the first image frame group, and need not shift the others.

The pseudo work generation unit 107 may shift at least one image frame out of two or three image frame with respect to the plurality of image frames included in the first image frame, and generate the pseudo image frame.

Due to generation of the pseudo image frame, an inter-frame difference of the real image frame obtained by the real work and an inter-frame difference of the pseudo image frame obtained by the pseudo work is difference. By difference of the inter-frame difference of the real work and the inter-frame difference of the pseudo work, when the moving image feature is calculated by the plurality of frames obtained by the two of work, the image feature whose is more than a prescribed number can be obtained and it becomes possible to improve accuracy of detection of the abnormal measure.

Referring back to FIG. 2, the pseudo work generation unit 107 outputs the real image frame and the pseudo image frame to the normal space generation unit 108.

The normal space generation unit 108 calculates the moving image feature based on the real image frame and the pseudo image frame, and generates the normal space data including one or more moving image feature. For example, the normal space generation unit 108 may obtain the moving image feature by calculating cubic higher-order local auto correlation by using binary data of temporally sequential three image frames. The moving image feature calculated by the above mentioned may referred to as CHLAC feature, for example.

The normal space generation unit 108 calculates the CHLAC feature using a following formula, for example.

[Formula 1]

$$x=(x_1, x_2, \ldots, x_N) \quad (1)$$

[Formula 2]

$$x_i = \int_A f(r) f(r+a_1^i) \ldots f(r+a_N^i) dr \quad (2)$$

Here, "x" in the formula 1 indicates the CHLAC feature. Further, in the formula 2, "A" indicates a three-dimensional pixel set constituted by Z image frames, "r" indicates one pixel in "A" (position vector), "a" indicates a displacement vector from "r", and "f(r)" indicates a luminance value at position "r".

The normal space generation unit 108 stores the formula (2) in an internal memory and calculates the CHLAC feature by substituting the luminance value of a local area (3×3 pixels) of the binarized real work data and pseudo work data into the formula (2) or the like, for example. The normal space generation unit 108 generates the normal space data including one or a plurality of the CHLAC feature by calculating the CHLAC feature. The normal space generation unit 108 outputs the generated normal space data to the comparison unit 109.

The comparison unit 109 calculates the abnormal measure by comparing the normal space data with the moving image feature obtained by the operation work of the robot 200, and performs abnormal detection based on the calculated abnormal measure. For example, the comparison unit 109 performs as follows.

Namely, the image sensor 101-1, 101-2 images the work (or operation) of the robot 200 during the operation of the robot 200 of the Factory Automation work, and generates the plurality of the image frames. The comparison unit 109 receives the plurality of the image frames via the image sensor controller 102 and the control unit 105. And, the comparison unit 109 calculates the moving image feature based on the plurality of the image frames. The CHLAC feature may be used as the moving image feature, same as the normal space generation unit 108, and in this case, the comparison unit 109 calculates with respect to the three image frames by using the formula (2) or the like, accordingly. The moving image feature to the work of the robot 200 under the operation may be calculated by not the comparison unit 109 but the control unit 105 and may be output to the comparison unit 109.

The comparison unit 109 generates the abnormal measure by comparing the normal space data with the moving image feature generated during the operation of the Factory Automation work. A Maharanobis distance indicating distance between the normal space data and the moving image feature of each frame may be used as the abnormal measure, for example. In this case, the comparison unit 109 may calculate the Maharanobis distance $D_m(x)$ by using a following formula, for example.

[formula 3]

$$D_M(x) = \sqrt{(x-\mu)^T \Sigma^{-1} (x-\mu)} \quad (3)$$

Here, $\mu=(\mu_1, \mu_2, \mu_3, \ldots, \mu_p)$ indicates an average, $\Sigma$ indicates a covariance matrix (which arranges a covariance among each variable), and x is a multivariable vector $x=(x_1, x_2, x_3, \ldots, x_p)$, respectively.

The comparison unit 109 stores the formula (3) in an internal memory or the like, and calculates the Maharanobis distance by substituting a numerical value into the formula (3) accordingly. The comparison unit 109 detects the abnormality when the calculated Maharanobis distance exceeds a set value and detects the non-abnormality when the Maharanobis distance is equal to or less than the set value. The comparison unit 109 outputs a detection result indicating presence or absence of the abnormality to the output unit 110. The comparison unit 109 may output the calculated Maharanobis distance to the output unit 110. An Euclidean distance in place of the Maharanobis distance may be used as the abnormal measure, for example.

The output unit 110 is a display unit, monitor or the like, for example, displays the presence or absence of the abnormality or the abnormal measure output from the comparison unit 109. In this case, the output unit 110 may graph the abnormal measure or the like, and display accordingly.

Operation Examples

Next, operation examples according to the second embodiment will be described. FIG. 4 is a flowchart illustrating the operation example. FIG. 4 indicates the operation example performed by the pseudo work generation unit 107, mainly.

The abnormal detection apparatus starts a process (S10), and sets a shift amount of an objective camera (S11). The shift amount is an amount shifted with respect to the real image frame, for example.

For example, a "blur" may occur in a camera imaging the Factory Automation work of the robot 200 according to an installation environment in a factory. In the present process, the shift amount is set by using a blur amount of pixel in the installation environment of the camera.

The inventor calculates a variation amount between the image frames when, in a predetermined laboratory environment, it causes the robot 200 to be stationary state, causes the camera to operate actually, and the robot 200 is imaged. As a result, the blur amount is calculated within a range from about 0.05 pixel to 0.1 pixel. The amount within the range from about 0.05 pixel to 0.1 pixel may be used as the shift amount, for example. For example, the shift amount may another amount, so long as the shift amount is within variation range according to the blur amount of the camera.

For example, the process (S11) may be performed by that the shift amount is stored in the internal memory and the pseudo work generation unit 107 reads out the shift amount from the internal memory. Or the shift amount may be input by that an operator operating the abnormal detection apparatus 10 operates a keyboard.

Next, the abnormal detection apparatus 10 inputs the moving image frame of the real work (or image frame) in a time series (S12). For example, the control unit 105 causes the robot 200 to perform the real work via the real work input unit 106, and inputs the image frame generated by the image sensor 101-1, 101-2 via the image sensor controller 102 in time series. In this case, the control unit 105 outputs the input image frame to the pseudo work generation unit 107 via the real work input unit 106.

Next, the abnormal detection apparatus 10 calculates a moving area in an image by using an inter-frame difference between the input frame and a rear frame (S13). For example, the control unit 105 focuses on the local area of the input image frame (3×3 pixels), and may calculate the moving area by calculating the difference between frames in the local area. In this case, the control unit 105 outputs the calculated moving area to the normal space generation unit 108 via the real work input unit 106 and the pseudo work generation unit 107.

Next, the abnormal detection apparatus 10 determines an image shift amount randomly based on an obtained motion component and the shift amount of the objective camera (S14). For example, the image shift amount includes the shift amount set by S11 and its displacement direction. For example, the pseudo work generation unit 107 determines the displacement direction randomly.

As the displacement direction, a displacement direction between the frames imaged under the real work of the robot may be used. For example, the displacement direction may be an up-and-down direction when the robot moves the up-and-down direction as the real work. In this case, when the pseudo image frame is generated by shifting a direction according to the displacement direction of the robot 200, the abnormal measure to a direction which is not the displacement direction of the robot 200 can be improved in comparison with a case of shifting to a random direction regardless of the displacement direction of the robot 200. As a result of actual measurement, when the pseudo image frame is generated by shifting the direction according to the displacement direction of the robot 200, regarding the abnormal measure, a result of improvement by about 20% can be obtained in comparison with in the case of shifting to a random direction regardless of the displacement direction of the robot 200.

Further, for example the up-and-down direction and the like, a plurality of directions becomes the displacement direction, even when the real image frame is shifted to the direction according to the displacement direction of the robot 200. Therefore, the abnormal detection apparatus 10 can determine the shift direction of the real image frame (for example, the up direction or down direction) as the random direction, even when the robot 200 is displaced to the direction according to the displacement direction.

For example, there is a technique using optical flow regarding to the detection of the displacement direction of the robot 200.

The detection of the displacement direction of the robot 200 using the optical flow is performed by the pseudo work generation unit 107 as follows, for example.

Namely, two image frames is indicated by

[Formula 4]

$$I(x,y,t) \quad (4)$$

[Formula 5]

$$I(x+\delta x, y+\delta y, t+\delta t) \quad (5)$$

In this case, the formula (4) indicates luminance of position (x,y) on the image at time t, and the formula (5) indicates luminance of the image when the displacement amount of the position becomes $\delta x$, $\delta y$ after a lapse of a micro time $\delta t$. In this case, when it is assumed that the formula (4)=the formula (5) and $\delta x$ and $\delta y$ are micro amount, the Taylor expansion is possible, and when the higher order is omitted, a following formula is obtained.

[Formula 6]

$$I_x u_x + I_y u_y = -I_t \quad (6)$$

In the formula (6), $I_x=\partial I/\partial x$, $I_y=\partial I/\partial y$, $I_t=\partial I/\partial t$, $(u_x, u_y)$ indicates x and y components of the optical flow, and $u_x=\delta x/\delta t$, $u_y=\delta y/\delta t$.

Therefore, the pseudo work generation unit 107 calculates the displacement direction of the robot 200, by selecting two image frames continuing in time from the plurality of input frames imaged under the real work, and calculating $(u_x, u_y)$ from the formula (6) based on the luminance of an each pixel of the two image frames or the like. And the pseudo work generation unit 107 may determine the shift direction of the image shift amount based on the calculated displacement direction.

Next, the abnormal detection apparatus 10 applies the determined image shift amount to the input frame, and generates the pseudo image frame (S16). For example, the pseudo work generation unit 107 generates the pseudo image frame by shifting an each pixel of the input image frame by the image shift amount.

Next, the abnormal detection apparatus 10 discriminates whether or not generates a predetermined number of samples of the pseudo image frame (S17). For example, the predetermined number of samples corresponds to a number of repetition times of the pseudo work. For example, the predetermined number of samples is stored in the internal memory in the pseudo work generation unit 107 or the like, and the discrimination may be performed by counting the frame number of the pseudo image frames generated by the S16 and whether or not the count value is equal to the predetermined number of samples.

The abnormal detection apparatus 10 moves the process to S14 and repeats the above process when not generating the predetermined number of samples of the pseudo image (No in S17). For example, the process moves to S14 when the number of the pseudo image frames generated by the pseudo work generation unit 107 is smaller than the predetermined number of samples, and the pseudo work generation unit 107 generates the predetermined number of samples of the pseudo image frame.

On the other hand, the abnormal detection apparatus 10 discriminates whether or not there is a next frame regarding to the input image (S18), when the abnormal detection apparatus 10 generates the predetermined number of samples of the pseudo image (S17). For example, the pseudo work generation unit 107 discriminates whether or not the next frame is input when the frame number of the generated pseudo image frames is equal to the predetermined number of samples.

The process moves to S12 when there is the next image frame (Yes in S18), and the abnormal detection apparatus 10 performs generation of the predetermined number of samples of the pseudo image frame to the next input image frame and the like (from S12 to S17).

The abnormal detection apparatus 10 ends a series of the process (S19), when there is no next image frame (No in S18).

<Actual Measurement Result and Effect>

Next, an actual measurement result and effect will be described. The inventor performed the actual measurement regarding to following two examples. The first example is an example of a case of performing the real work without performing the pseudo work and generating the normal space data. The second example is an example of a case of performing the real work and the pseudo work and generating the normal space data.

In the first example, it causes the robot 200 to perform repeatedly the real work 300 times. In the second example, it causes the robot 200 to perform repeatedly the real work 5 times and the pseudo work 295 times. In the second example, it can cause to perform the pseudo work 59×5=295 times to the real work 5 times by performing the pseudo work 59 times to the real work one time.

FIG. 5A to FIG. 5E indicate examples of the real work in a time series. As indicated in FIG. 5A to FIG. 5E, it causes a hand of the robot 200 to move up and down spending about 1.7 seconds as the real work of one time. This real work is performed same in the first and second examples. About 25 sheets of the image frames is generated by the image sensor 101-1, 101-2 every the real work of one time.

Figure 7:
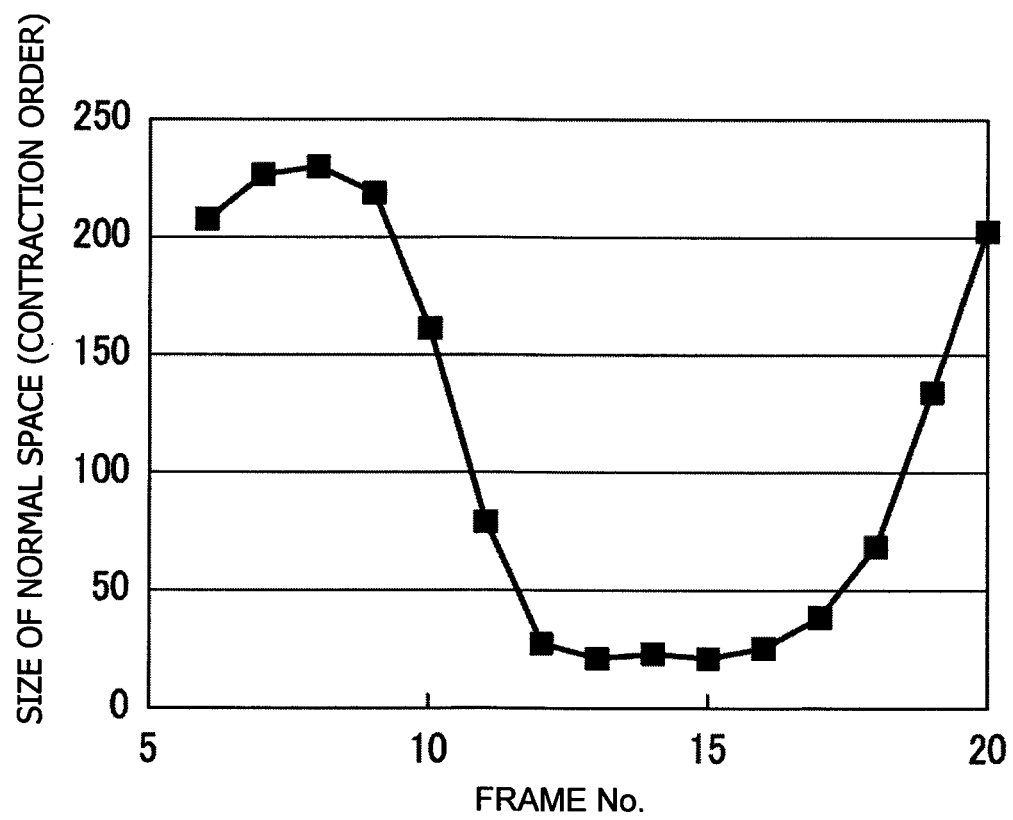
FIG. 7 is a graph illustrating an example of a size of normal space.

FIG. 6A to FIG. 7 indicate examples of the actual results of the first example (which is an example in case of causing to perform the real work 300 times). Of these, FIG. 6A to FIG. 6C indicate examples of the CHLAC feature and normal space in case of causing the robot 200 to perform the real work 300 times. A graph of upper side of FIG. 6A indicates the CHLAC feature of a first image frame of the real work. A graph of upper side of FIG. 6B indicates the CHLAC feature of an N-th (N is an integer which satisfies 2≤N≤22) image frame, and a graph of upper side of FIG. 6C indicates the CHLAC feature of a 23-th image frame, respectively. However, the CHLAC feature is calculated by using continuing three frames in the example. In each graph of the CALAC feature indicating FIG. 6A to FIG. 6C, a horizontal axis indicates a contraction order and a vertical axis indicates a frequency.

FIG. 7 indicates an example of a size of the normal space of every image frame in case of causing the robot 200 to perform the real work 300 times. A vertical axis indicates the size of the normal space (or contraction order) and a horizontal axis indicates a frame number.

As indicated in FIG. 7, it is indicated that a size of the normal space from the 5-th image frame to the 10-th image frame (for example, FIG. 5A, FIG. 5B, or the like) is bigger than the other image frames and a motion amount of the robot 200 is larger than the other image frames.

On the other hand, it is indicated that a size of the normal space from the 12-th image frame to the 17-th image frame (for example, FIG. 5C or the like) is smaller than the other image frames and the motion amount of the robot 200 is smaller than the other image frames.

Figure 8:
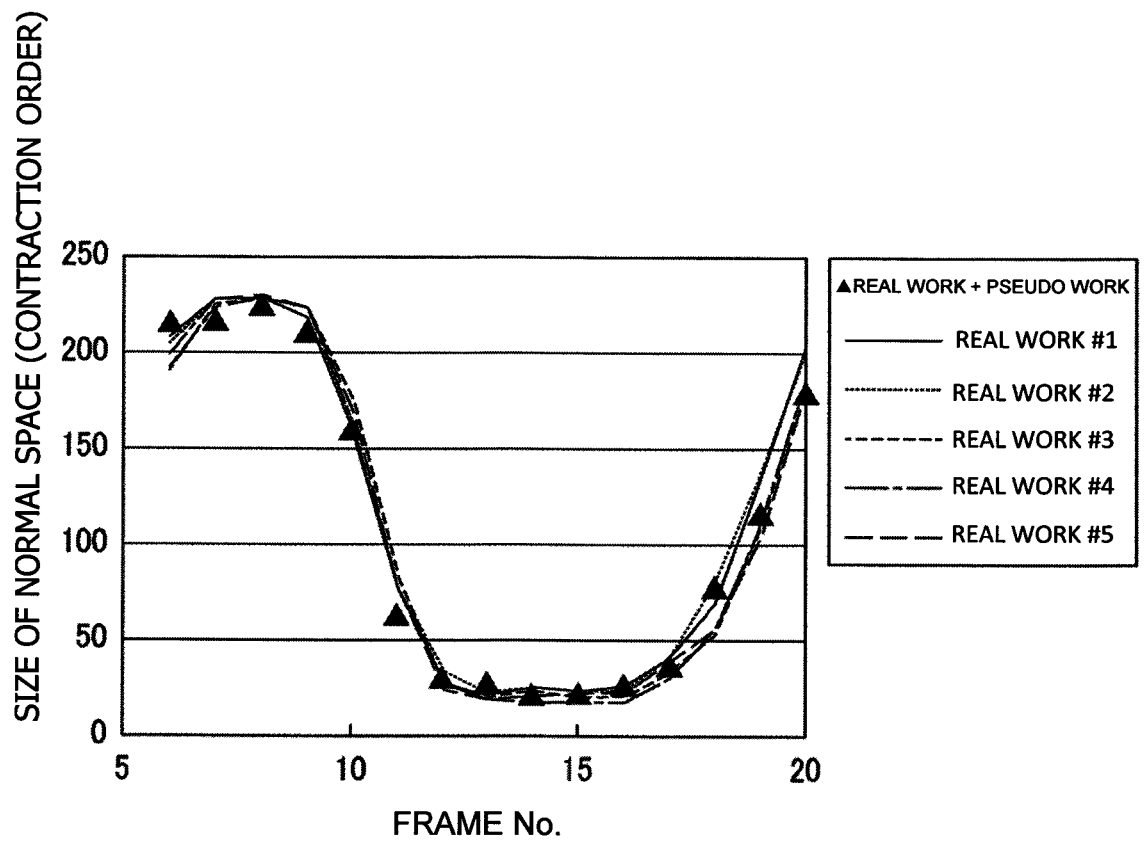
FIG. 8 is a diagram illustrating examples of a size of normal space by real work and a size of normal space by real work and pseudo work, respectively.

In contrast, FIG. 8 indicates a comparison result of the first example and the second example (which is an example of causing to perform the real work 5 times and the pseudo work 295 times). In the first example, the real work is repeated 5 times, and, in FIG. 8, the size of the normal space in every time (a first time of the real work is "real work #1", a second time of the real work is "real work #2", and the like) is plotted on the graph. On the other hand, in FIG. 8, the size of the normal space of the second example (the real work 5 times and a similar work 295 times) is plotted by a triangulation point.

As indicated in FIG. 8, regarding to the size of the normal space in the case of performing the real work without performing the similar work and the size of the normal space of the real work and the similar work, a nearly same result is obtained.

Figure 9:
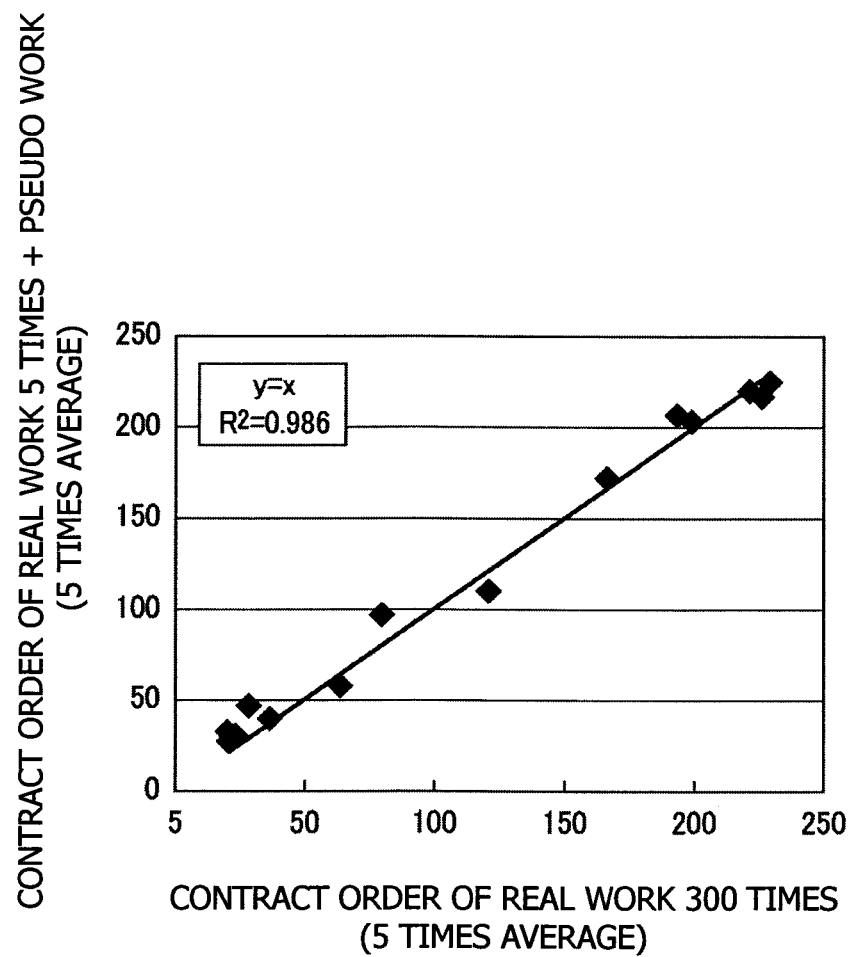
FIG. 9 is a graph illustrating an example of linearity.

FIG. 9 is a graph indicating linearity of the size of the normal space in the case of performing the real work without performing the similar work and the size of the normal space of the real work and the similar work. When a horizontal axis is the size of the normal space in the case of performing the real work without performing the similar work and a vertical axis is the size of the normal space in the case of performing the real work and similar work, it is indicated that a dot is approximately plotted on a function of y=x and two sizes are approximately same. In the example of FIG. 9, as matching degree $R^2$, $R^2$=0.986 is obtained. Further, when $R^2$=1, it means that x and y are perfectly matched (y=x).

From the above, the abnormal detection apparatus 10 is obtained almost same results, regarding the size of the normal space obtained by the real work and similar work and the size of the normal space obtained by performing the real work without performing the similar work. And, in this case, as compared with the real work 30 times, the generation time for the normal space in the real work is 5 times, and it is possible to reduce the number of the work. In real measurement, the generation time for the normal space can be shortened to about 1/40 as compared with the only real work.

Next, an abnormal detection result will be described. FIG. 10A to FIG. 10D indicate examples of the abnormal detection result in a case of generating the normal space by the first example (real work 300 times). On the other hand, FIG. 11A and FIG. 11B indicate examples of the abnormal detection result in a case of generating the normal space by the second example (real work 5 times and similarly work 295 times).

FIG. 10A indicates an example of the CHLAC feature of a specific frame A. Variation is added to a total displacement vector for frame A. FIG. 10B indicates an example of the CHLAC feature in a case of adding the variation to the frame A.

FIG. 10C indicates an example of time transition of the abnormal measure at a normal time. A horizontal axis indicates time and a vertical axis indicates the Maharanobis distance. A threshold value indicating whether or not it is abnormal is set to "1". In contrast, FIG. 10D indicates an example of time transition of the abnormal measure in case of adding the variation to the frame A. As indicated in FIG. 10D, it is obtained that the abnormal measure exceeds the threshold value "1" at a time when the frame A appears, and the abnormal is detected is detected.

Figure 11B:
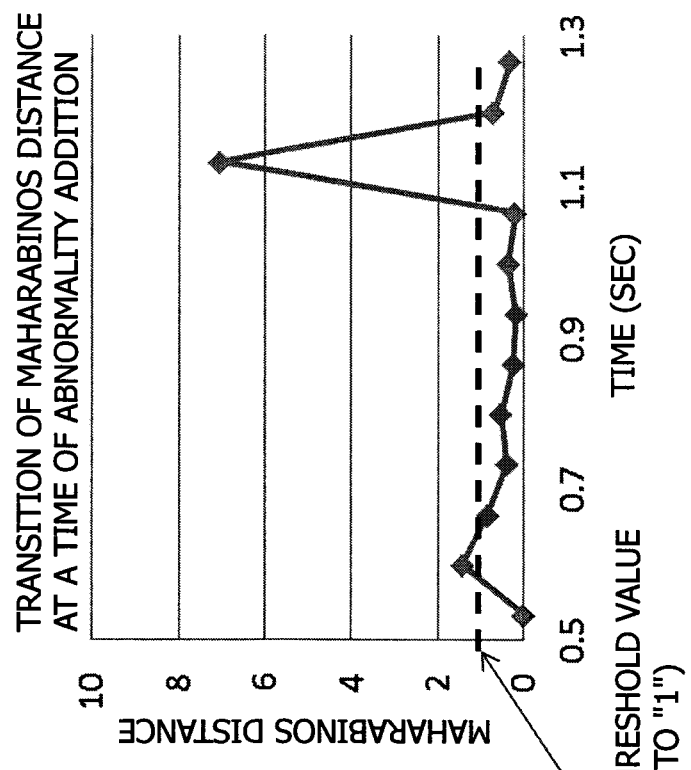
FIG. 11A and FIG. 11B are diagrams illustrating detection examples of abnormal measure by real work and pseudo work.
Figure 11A:
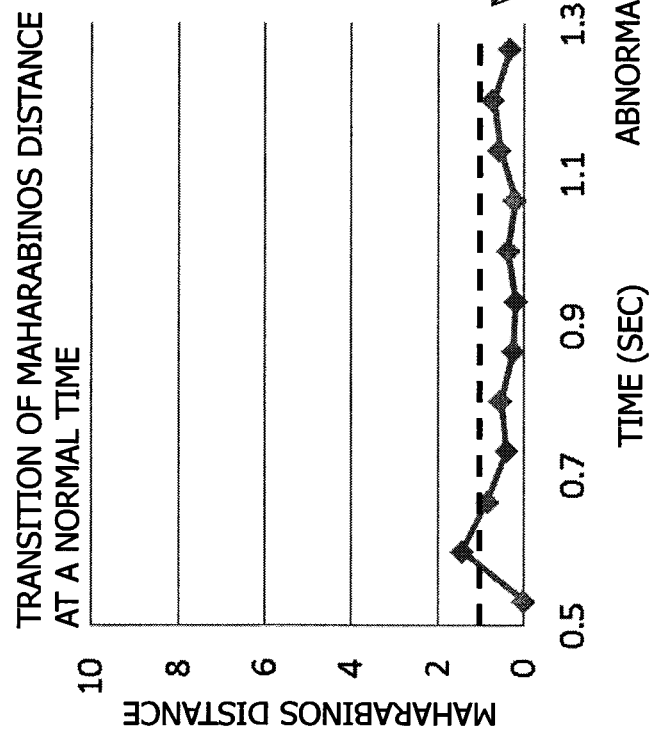

On the other hand, as indicated in FIG. 11A, when the normal space of the second example is used, the abnormal measure which is equal to or greater than the threshold value is not detected at the normal time, similarly to the case of the normal space when the real work is performed 300 times. Further, as indicated in FIG. 11B, in the case of adding the variation to the frame A similarly to FIG. 10B, a result is obtained that the abnormal measure exceeds the threshold value at the time when the frame A appears.

Regarding the abnormal measure, in the case of combination of the real work and the pseudo work, an approximately same detection sensitivity is obtained, comparing to the case of performing the real work without performing the similarly work. Therefore, the abnormal detection apparatus 10 according to the second embodiment can perform the abnormal detection with accuracy, similarly to the case of performing the real work without performing the similarly work.

Accordingly, the abnormal detection apparatus 10 according to the second embodiment can generate the accurate normal space data with a small number of work, and generate the accurate normal space data at a short time, when the Factory Automation work is started up and the like.

Third Embodiment

Next, a third embodiment will be described. The third embodiment is an example of selecting the pseudo image frame randomly in a time direction and performing the pseudo work, for example. The configuration example of the abnormal detection apparatus 10 according to the third embodiment is same as the second embodiment, and is indicated in FIG. 2.

Figure 12A:
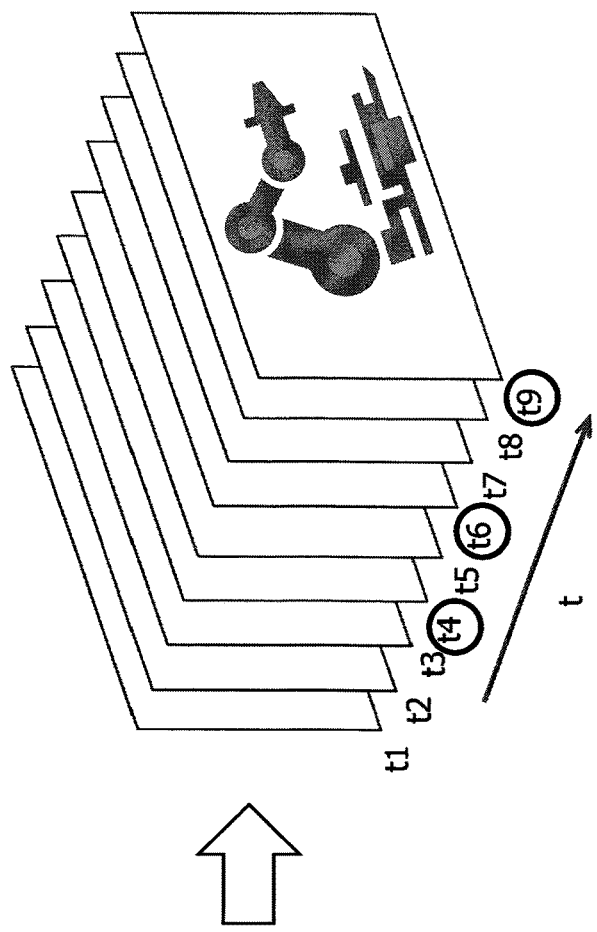
FIG. 12A is a diagram illustrating an example of a real image frame.
Figure 12B:
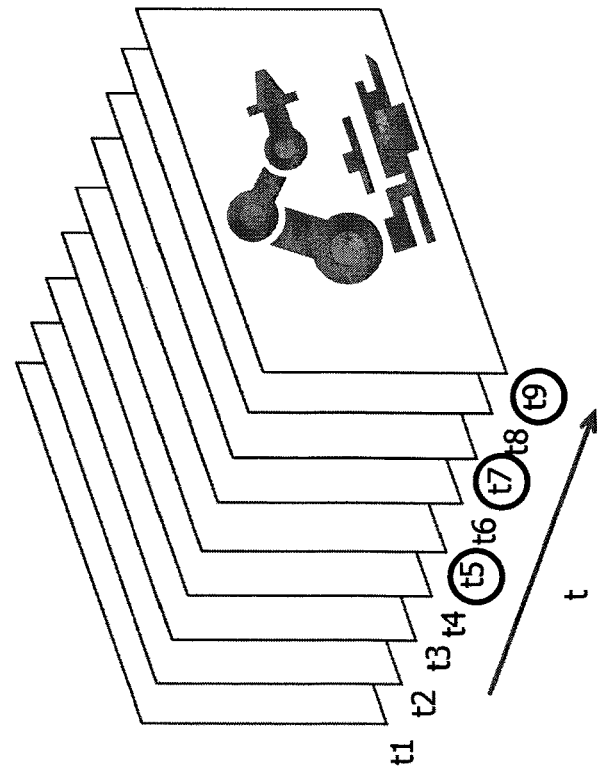
FIG. 12B is a diagram illustrating an example of a pseudo image frame, respectively.

FIG. 12A and FIG. 12B indicate an example of generation of the pseudo image frame according to the third embodiment. Of these, FIG. 12A indicates an example of the real image frame generated by the real work, and FIG. 12B indicate an example of the pseudo image frame generated by the pseudo work, respectively.

In the third embodiment, the real work is imaged with a frame rate higher than a frame rate when the Factory Automation work is operated. For example, the example of FIG. 12A indicates an example of a case of imaging at a frame rate which is 3 times as large as a frame rate at the time of the operation. For example, of nine image frames from t1 to t9, three image frames of t5, t7, and t9 are selected, thereby, the image frame is thinned out so as to be the frame rate at the time of the operation, and the moving image feature is calculated from the three image frames.

In this case, in the third embodiment, with respect to the real image frame of t5, the real image frame of t4 is selected randomly from the real image frame within a predetermined range. Further, to the real image frame of t7, the real image frame of t6 is selected randomly from the real image frame within the predetermined range. And, to the real image frame of t9, the image frame of t9 is selected randomly from the real image frame within the predetermined range. The selected real image frames of t4, t6, and t9 become the pseudo image frame. In this case, the abnormal detection apparatus 10 generates the normal space data by the three real image frame of t5, t7, and t9 by the real work and the three pseudo image frames of t4, t6, and t9 by the pseudo work.

In this case, the predetermined range is a range based on variation amount of the movement time of the robot 200. Temporal variation occurs due to various factors, when it causes the robot 200 to perform repeatedly the real work multiple times. For example, when it causes the robot 200 to perform a certain work, there is a case that a first work and a second work finish at a different time in spite of starting same time. In this manner, there is a case that the variation occurs regarding the movement time of the robot 200 in spite of the same work. Then, a range not exceeding the variation amount sets as the predetermined range, and the abnormal detection apparatus 100 generates the pseudo image frame by selecting randomly the real image frame from within the variation range.

The inventor performed an experiment about variation time of the robot 200 with respect to the real work (about 10 seconds) in a predetermined environment. As a result, the temporal variation is about 100 ms. For example, the abnormal detection apparatus 10 selects the real image frame randomly from the plurality of real image frames within a range of 100 ms before and after (or a range of 50 ms before and after), with respect to the objective real image frame. The variation amount of 100 ms is an one example, and other variation amount may be used.

Figure 13:
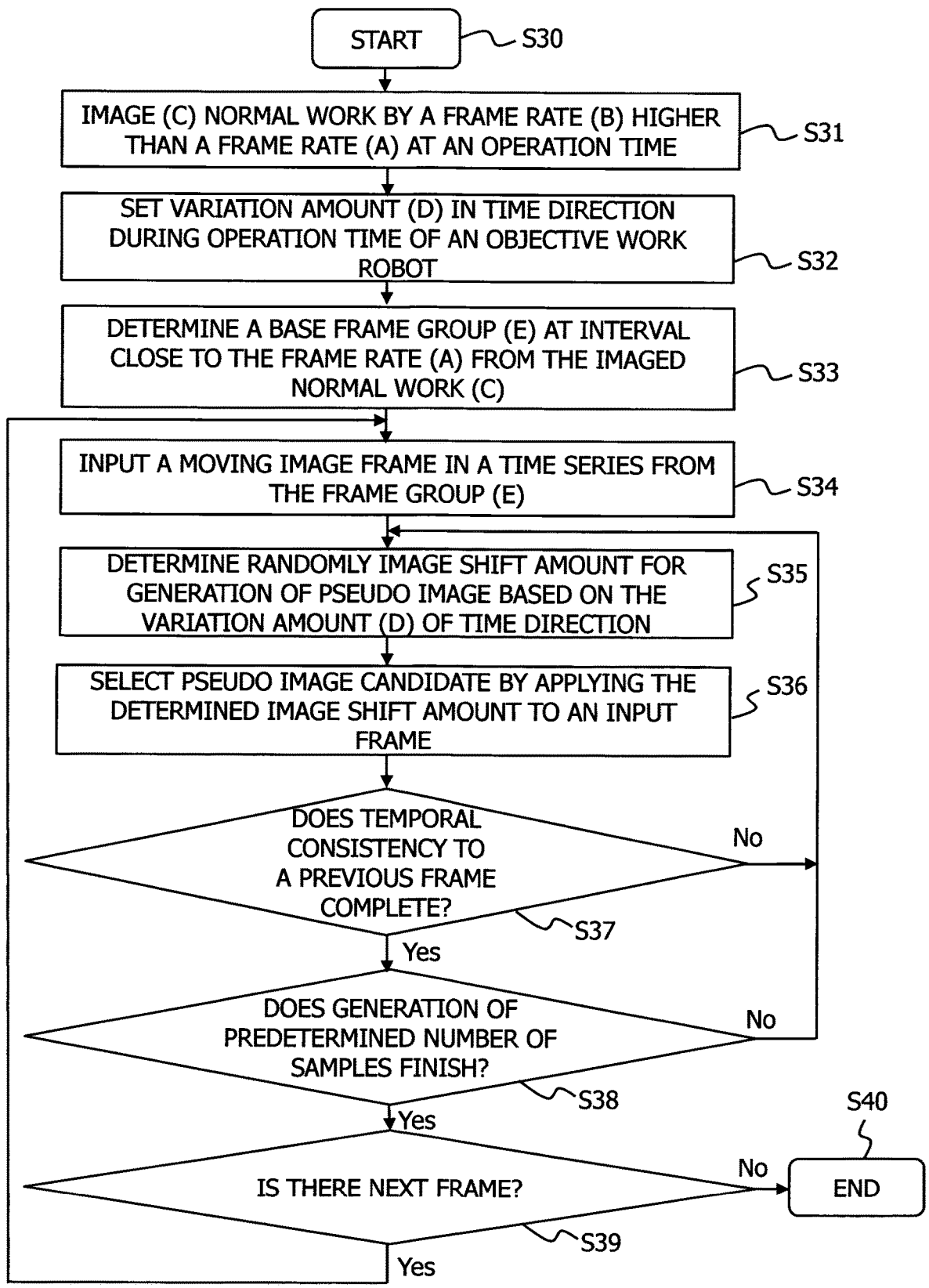
FIG. 13 is a flowchart illustrating an example of operation.

FIG. 13 is a flowchart illustrating the operation example according to the third embodiment. FIG. 12 indicates the operation example performed by the pseudo work generation unit 107 mainly.

The abnormal detection apparatus 10 starts the process (S30), and images the real work by the frame rate higher than the frame rate at the time of the operation (S31). For example, the image sensor 101-1, 101-2 image the real work, and generates the plurality of image frames by the real work, and outputs the image frame to the control unit 105 via the image sensor controller 102.

Next, the abnormal detection apparatus 10 sets the variation amount in the time direction of the robot 200 (S32). For example, the control unit 105 may set by reading the variation amount (for example, 100 ms) stored in an internal memory or the like, or set by inputting the variation amount by operating a keyboard by the operator of the abnormal detection apparatus 100. In this case, the control unit 105 outputs the set variation amount to the pseudo work generation unit 107 via the real work input unit 106.

Next, the abnormal detection apparatus 10 determines the second image frame group which is a base at close interval to the frame rate from the imaged normal work (or the real work) (S33). For example, the control unit 105 determines the second frame group by selecting three image frames from the nine image frames by the real work, when the real work is imaged by three times frame rate. In this case, the control unit 105 outputs the each image frame included in the second image frame group to the pseudo work generation unit 107 via the real work input unit 106 sequentially.

Next, the abnormal detection apparatus 10 inputs the moving image frame (or image frame) in time series from the second image frame group. For example, the pseudo work generation unit 107 inputs the image frame output from the control unit 105 sequentially.

Next, the abnormal detection apparatus 10 determines randomly image shift amount for generation of the pseudo image based on the variation amount of the time direction (S35). For example, the pseudo work generation unit 107 may use the variation amount set by the S21 (for example, 100 ms) as the image shift amount, or may use the amount of range not exceeding the variation amount (for example, 50 ms) as the image shift amount, and performs randomly the selection of the variation amount.

Next, the abnormal detection apparatus 10 applies the determined image shift amount to the input frame and selects the pseudo image candidate (S36). For example, the pseudo work generation unit 107 selects the real image frame positioned at the variation amount (for example, 50 ms) determined by S35, with respect to the objective real image frame (S34).

Next, the abnormal detection apparatus 10 confirms time series of the real image frame selected as the pseudo image frame and confirms time consistency (S37). For example, the pseudo work generation unit 107 compares the real image frame selected by S36 with the real image frame selected by an image frame temporally earlier than the objective image frame (S34), and confirms whether or not the former real image frame is located after the latter real image frame.

The abnormal detection apparatus 10 selects randomly the real image frame again (S35, S36), when the abnormal detection apparatus 10 confirms that the time consistency of the selected real image frame is not maintained (No in S37).

On the other hand, the abnormal detection apparatus 10 determines whether or not the abnormal detection apparatus 10 generates the pseudo image frame of a predetermined number of samples (S38), when the abnormal detection apparatus 10 confirms that the time consistency of the selected real image frame maintains (Yes in S37). For example, as in the second embodiment, regarding the selected real image frame, the pseudo work generation unit 107 may determine by counting frame numbers of the selected real image frame and by whether or not the count value reaches the predetermined number of samples.

The abnormal detection apparatus 10 moves to S35 and repeats the generation of the pseudo image frame (S35-S37), when the generation of the predetermined number of sample about the pseudo image frame is not finished (No in S38).

On the other hand, the abnormal detection apparatus 10 determines whether or not there is a next input image frame (S39), when the generation of the predetermined number of samples about the pseudo image frame is finished (Yes in S38). The abnormal detection apparatus 10 moves to S34 and repeats the above process, when there is the next input image frame (Yes in S39). On the other hand, the abnormal detection apparatus 10 ends the series of processes, when there is no the next input image frame (No in S39).

After that, the abnormal detection apparatus 10 calculates the moving image feature by using the CHLAC feature or the like based on the real work frame and the pseudo work frame as in the second embodiment and generates the normal space data. And, as in the second embodiment, the abnormal detection apparatus 10 compares the normal space data with the moving image feature extracted from the image frame generated at the time of operation of the robot 200 and detects the abnormality.

In FIG. 12A and FIG. 12B, it is described about the example that the pseudo work generation unit 107 selects three frames of the pseudo image frame with respect to three frames of the real work frame.

For example, the pseudo work generation unit 107 selects randomly the first and third image frames, the third and second image frames, or the third and fourth image frames, included in the first image frame group, with respect to the first and second image frames included in the first image frame group. Thereby, the pseudo work generation unit 107 may generate each the image frame included in the second image frame group. Each the image frame included in the first image frame group is a real image frame obtained the real work, and each the image fame included in the second image frame group is a pseudo image frame obtained by the pseudo work. In this case, in the pseudo work generation unit 107, each the image frame included in the second image frame group is included within the range of variation amount of movement time of the robot 200 and becomes an order to time direction.

In the third embodiment, the pseudo work generation unit 107 selects the real work frame randomly to the time direction, thereby the inter-frame difference of the real image frames and the difference of the pseudo image frames are different.

Therefore, the abnormal detection apparatus 10 can obtain more the moving image features than the predetermined number on calculating the moving image feature by the plurality of the frames obtained by two of work, and improve the accuracy of detection of abnormal measure.

And, the abnormal detection apparatus 10 obtains the number of image frame same as the case that the real work of N time is repeated by combined the pseudo work and the real work, and can make less the number of work of the real work than N times, in comparison with the case of repeating the real work N times.

Accordingly, the abnormal detection apparatus 10 can reduce the number of the work, and obtain highly the accurate normal space data in consideration of time efficiency on starting the Factory Automation work.

Other Embodiments

Figure 14:
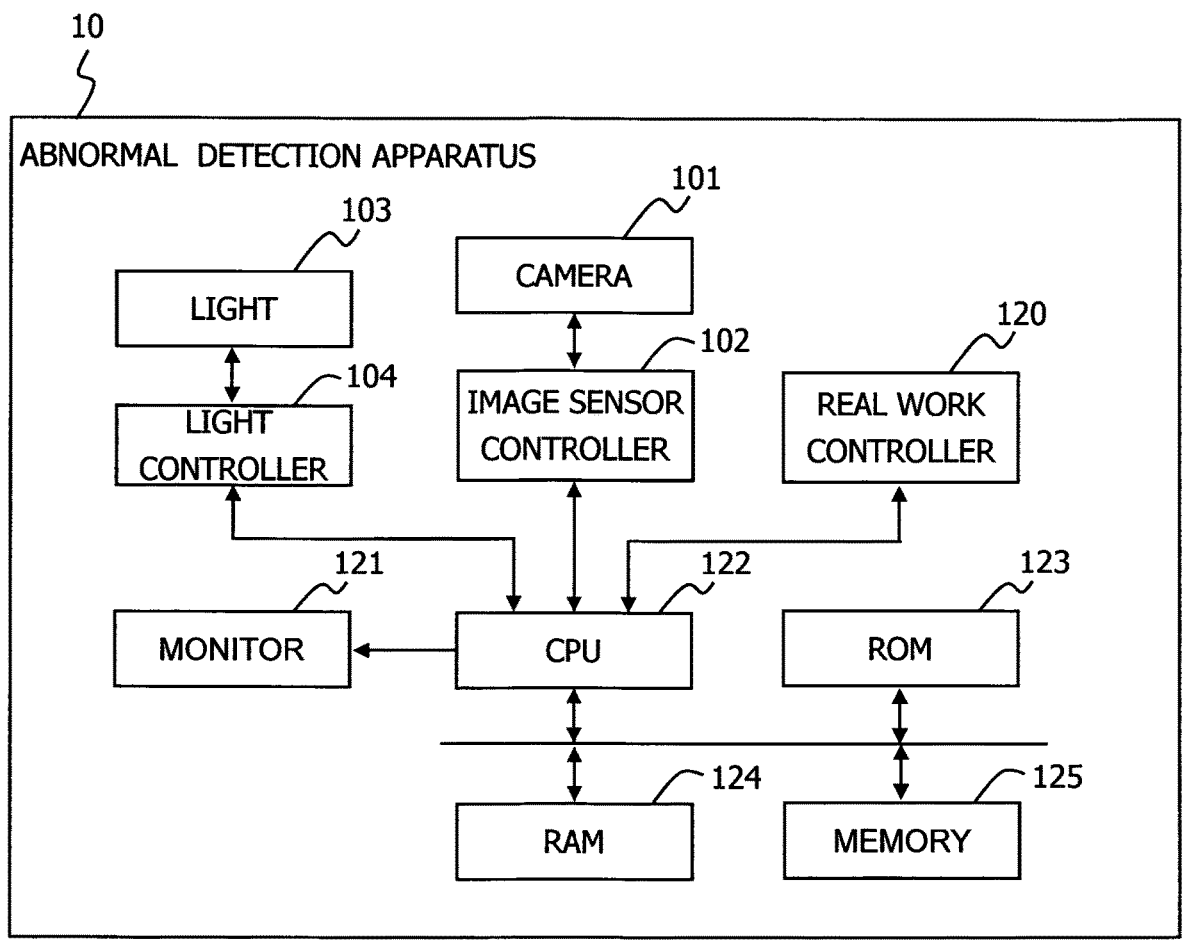
FIG. 14 is a diagram illustrating a hardware configuration example of an abnormal detection apparatus.

FIG. 14 is a diagram illustrating a hardware configuration example of the abnormal detection apparatus 10. The abnormal detection apparatus 10 includes a real work controller 120, a monitor 121, CPU (Central Processing Unit) 122, ROM (Read Only Memory) 123, RAM (Random Access Memory) 124, and memory 125. Here, for example, a camera 101 corresponds the image sensor 101-1, 101-2 according to the second and third embodiments. And, for example, a Light 103 corresponds the luminaire 103-1, 103-2 according to the second and third embodiments.

The CPU 122 reads out a program stored in ROM 123, roads the program on the RAM 124, and perform the road program, thereby the CPU 122 performs the function of the control unit 105, the pseudo work generation unit 107, the normal space generation unit 108, and the comparison unit 109. Therefore, the control unit 105, the pseudo work generation unit 107, normal space generation unit 108, and the comparison unit 109 according to the second and third embodiments correspond the CPU 122, for example.

Further, the real work controller 120 corresponds the real work input unit 106 according to the second and the third embodiments, for example. And, the monitor 121 corresponds the output unit 110 according to the second and third embodiments, for example.

Further, instead of the CPU 122, a controller such as a MPU (Micro Processing Unit), FPGA (Field Programmable Gate Array) or the like may be used.

In the above embodiment, the CHLAC feature is described as an example of the moving image feature. Other than the CHLAC feature, the moving image feature such as a HLAC (Higher-order Local Auto Correlation) feature, CCHLAC (Color Cubic Higher-order Local Auto Correlation) feature may be used. Further, for example, the feature data is extracted by using three number of the image frames in the CHLAC feature, but a method that the feature data is extracted by using two numbers of the image frames may be used. Further, the moving image feature may be extracted by using more than four numbers of the image frames.

And, the above abnormal detection apparatus 10 is described by the example of the case of performing the abnormal detection of the Factory Automation. For example, the abnormal detection apparatus 10 may be used for detection of abnormal trespasser, crossing obstacle, traffic obstacle or the like.

It is possible to provide an abnormal detection apparatus and abnormal detection method which generate accurate a normal space data with a small number of work.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

REFERENCE SIGNS LIST

10: Abnormal detection apparatus
101-1, 101-2: Image sensor
102: Image sensor controller
105: Control unit
106: Real work input unit
107: Pseudo work generation unit
108: Normal space generation unit
109: Comparison unit
122: CPU

What is claimed is:

1. An abnormal detection apparatus comprising:
an imager configured to image an object and generate first and second image frames included in a first image frame group;
a pseudo work generator configured to generate the first image frame and a third image frame, the third image frame and the second image frame, or the third image frame and a fourth image frame, included in a second image frame group, respectively, by selecting randomly in a time direction a selected image frame included in the first image frame group with respect to at least one of the first and second image frames included in the first image frame group;
a normal space generator configured to generate a normal space data based on the first and second image frames included in the first image frame group, and the first and third image frames, the third and second image frames, or the third and fourth image frames, included in the second image frame group; and
a comparer configured to detect abnormality of the object based on the normal space data.

2. The abnormal detection apparatus according to claim 1, wherein
the pseudo work generator is configured to generate:
the first and third image frames included in the second image frame group by selecting the first and third image frames included in the first image frame group with respect to the first and second image frames included in the first image frame group,
the third and second image frames included in the second image frame group by selecting the third and second image frames included in the first image frame group with respect to the first and second image frames included in the first image frame group, or
the third and fourth image frames included in the second image frame group by selecting the third and fourth image frames included in the first image frame group with respect to the first and second image frames included in the first image frame group.

3. The abnormal detection apparatus according to claim 1, wherein the pseudo work generator is configured to select the first and third image frames, the third and second image frames, or the third and fourth image frames, included in the second image frame group, which are image frames included within a range of a variation amount of movement time of the object and ordered in the time direction.

4. The abnormal detection apparatus according to claim 1, wherein
the imager is configured to image the first and second image frames included in the first image frame group at a first frame rate, and
the pseudo work generator is configured to select the first and third image frames, the third and second image frames, or the third and fourth image frames, included in the second image frame group, so as to become a second frame rate which is a frame rate lower than the first frame rate and the frame rate when the imager is configured to image the object on detecting the abnormality by the comparer.

5. The abnormal detection apparatus according to claim 1, wherein
the imager is configured to image the object and generate the first image frame, the second image frame, and a fifth image frame, included in the first image frame group,
the pseudo work generator is configured to generate:
the first image frame, the second image frame, and a sixth image frame,
the first image frame, the third image frame, and the sixth image frame,
the third image frame, the second image frame, and the sixth image frame,
the third image frame, the fourth image frame, and the sixth image frame,
the first image frame, the third image frame, and the fifth image frame, the third image frame, the second image frame, and the fifth image frame, or the third image frame, the fourth image frame, and the fifth image frame, included in the second image frame group, respectively, with respect to the first image frame, the second image frame, and the fifth image frame, included in the first image frame group, and the normal space generator is configured to extract feature data by Cubic Higher-order Local Auto Correlation (CHLAC) based on each image frame included in the first image frame group and each image frame included in the second image frame group, and generate the normal space data including the extracted feature data.

6. The abnormal detection apparatus according to claim 1, wherein the pseudo work generator is configured to select randomly a part of the image frames included in the first image frame group.

7. An abnormal detection method in an abnormal detection apparatus including an imager that images an object and generates a first and second image frames included in a first image frame group, a pseudo work generator, and a normal space generator, the method comprising:

generating the first image frame and a third image frame, the third image frame and the second image frame, or the third image frame and a fourth image frame, included in a second image frame group, respectively, by selecting randomly in a time direction a selected image frame included in the first image frame group with respect to at least one of the first and second image frames included in the first image frame group, by the pseudo work generator;

generating a normal space data based on the first and second image frames included in the first image frame group, and the first and third image frames, the third and second image frames, or the third and fourth image frames, included in the second image frame group, by the normal space generator; and detecting abnormality of the object based on the normal space data, by the comparer.

8. A non-transitory computer-readable storage medium storing therein an abnormal detection program that causes a computer of an abnormal detection apparatus to execute a process comprising:

imaging an object and generating a first and second image frames included in a first image frame group;

generating the first image frame and a third image frame, the third image frame and the second image frame, or the third image frame and a fourth image frame, included in a second image frame group, respectively, by selecting randomly in a time direction a selected image frame included in the first image frame group with respect to at least one of the first and second image frames included in the first image frame group;

generating a normal space data based on the first and second image frames included in the first image frame group, and the first and third image frames, the third and second image frames, or the third and fourth image frames, included in the second image frame group; and detecting abnormality of the object based on the normal space data.

* * * * *